E. A. McALEECE.
BROKEN FLANGE DETECTOR FOR CAR WHEELS.
APPLICATION FILED JUNE 21, 1913.

1,101,462.

Patented June 23, 1914.

UNITED STATES PATENT OFFICE.

EARL A. McALEECE, OF DUBUQUE, IOWA.

BROKEN-FLANGE DETECTOR FOR CAR-WHEELS.

1,101,462.      Specification of Letters Patent.     Patented June 23, 1914.

Application filed June 21, 1913. Serial No. 775,119.

*To all whom it may concern:*

Be it known that I, EARL A. MCALEECE, a citizen of the United States, residing at Dubuque, in the county of Dubuque and State of Iowa, have invented certain new and useful Improvements in Broken-Flange Detectors for Car-Wheels, of which the following is a specification.

This invention relates to a new and useful means for detecting broken flanges upon car wheels and especially upon heavy cars such as railway or street cars, and has for its primary object the provision of a means of this nature which will automatically give a signal or apply the air brakes, thus stopping the train, when a flange upon one of the wheels becomes broken before the car is derailed, thereby materially reducing the liability of accidents from the breaking of the flange.

With the foregoing and other objects in view, this invention consists in such novel features of construction, combination and arrangement of parts as will be hereinafter more fully described, illustrated in the accompanying drawings and claimed.

Figure 1:
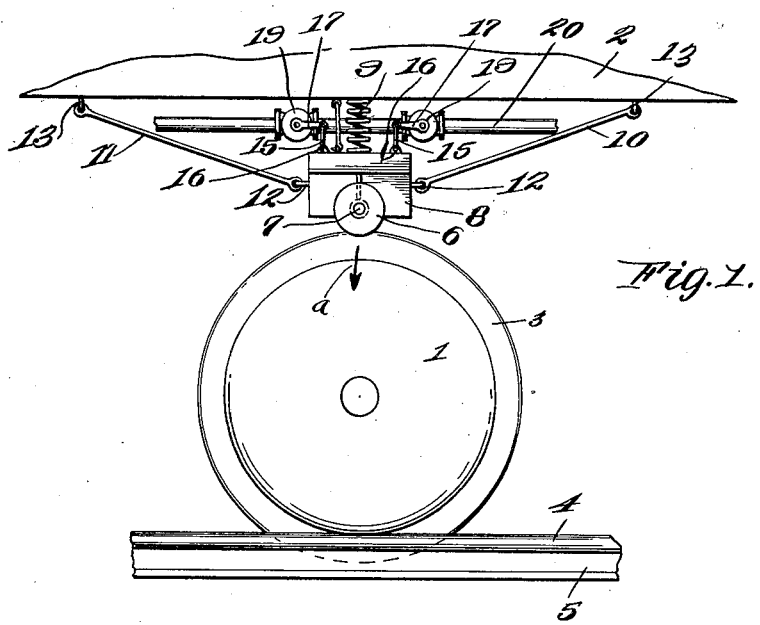
Figure 2:
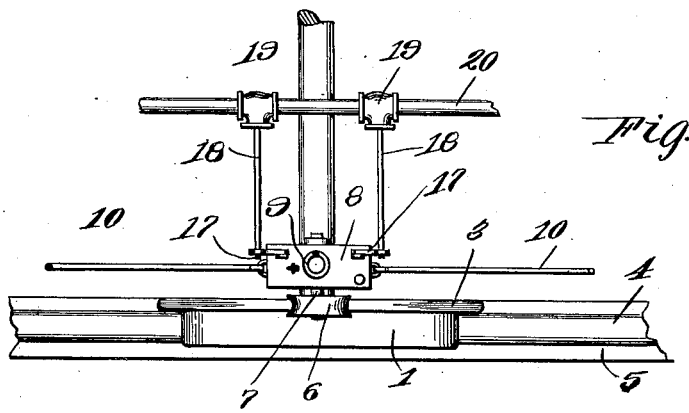

In describing the invention in detail, reference will be had to the accompanying drawings wherein like characters of reference designate like or corresponding parts throughout the several views, and in which, Figure 1 is a side elevation of the improved broken-flange detector, showing the same applied to a fragment of a car; and, Fig. 2 is a top plan view of Fig. 1.

Referring to the drawings by numeral, 1 designates the wheel of a car 2 of which only a fragment is shown and which wheel has a flange 3 formed upon its inner side and extending around its periphery for engaging the tread 4 of the T-rail 5 such as is commonly used in railway tracks. The flange 3 engages the side of the tread 4 of the T-rail 5 while the periphery of the wheel 1 engages the upper surface of the tread 4, as is clearly illustrated in Fig. 1.

Resting upon the periphery of the flange 3 and positioned so that it will at all times be in engagement with the portion of the flange 3 which is uppermost is a wheel or feeler 6 which has a concave outer bearing surface as is illustrated in Fig. 2, so as to more efficiently engage the flange 3 and also so as to be more susceptible to the irregularities of broken parts of the flange. The wheel 6 is rotatably mounted upon a pin 7, which pin is carried by a bracket or supporting structure 8. The bracket or supporting structure 8 is constructed of angle iron and has an expanding coil spring 9 seated upon its upper side and engaging the under surface of the car 2. The coil spring 9 tends to hold the wheel 6 in engagement with the periphery of the flange 3 at all times. The bracket 8 is held in its proper position by means of two rods 10 and 11 which are loosely connected, by means of eyelets 12 and 13, to the ends of the bracket 8 and to the under surface of the car 2. These rods being loosely connected will permit the bracket 8 and the wheel 6 to move downwardly as would be the case when the portion of the flange 3 is broken away but will hold the bracket 8 and the wheel 6 from moving longitudinally with relation to the car 2. Links 15 are pivotally connected to brackets 16 which are formed upon the upper surface of the bracket 8 and also to levers 17. The levers 17 are mounted upon the outer ends of rods 18, which rods control the operation of valves 19 which are mounted within the air line 20 of the car 2 or train (not shown). When a portion of the flange 3 is broken away, the wheel 6, coming in contact with the broken portion, will follow the broken part of the flange and consequently move downwardly or in the direction of the arrow A. This will move the links 15 downwardly and also the arms 17, causing them to rock the rods 18 and immediately operate the valves 19 which will in turn operate the air system and automatically set the air brakes of the train and cause the same to come to a stop before the car which is carrying the wheel with the broken flange is derailed, thereby avoiding any serious accident and acquainting the person in charge of the train of the fact that one of the flanges of one of the wheels has been broken.

In practical fields, certain minor features of construction, combination and arrangement of parts may necessitate alterations to which the patentee is entitled, provided such alterations are comprehended within the scope of what is claimed.

What is claimed is:—

1. The combination with a car wheel having a flange formed thereupon of, a wheel engaging the periphery of said flange at its uppermost point, said wheel rotatably mounted upon a pin which is supported by a bracket and forming a feeler for detecting broken places in said flange, and resilient means for yieldably holding said wheel in engagement with the flange of the car wheel.

2. The combination with a car wheel having a flange formed thereupon of, a wheel engaging the periphery of said flange at its uppermost point, said wheel rotatably mounted upon a pin which is supported by a bracket and forming a feeler for detecting broken places in said flange, said wheel having its outer surface concave so as to more efficiently engage the periphery of said flange, and means yieldably holding said wheel in engagement with said flange.

3. The combination with a car wheel having a flange formed thereupon of, a wheel engaging the periphery of said flange at its uppermost point, said wheel rotatably mounted upon a pin which is supported by a bracket and forming a feeler for detecting broken places in said flange, said wheel having its outer surface concave so as to more efficiently engage the periphery of said flange, and means for yieldably holding said wheel in engagement with the periphery of said flange at all times.

4. The combination with a car wheel having a flange formed thereupon, a car, a valve controlled air line for said car, of, a wheel engaging the periphery of said flange at its uppermost point, said wheel rotatably mounted upon a pin, a bracket for supporting said pin, said wheel having an outer concave surface so as to more efficiently engage the periphery of said flange, means for causing said wheel to be at all times in engagement with the periphery of said flange, and means connected to said bracket for automatically operating the valves in said air line.

5. The combination with a car wheel having a flange formed thereupon, a car, a valve controlled air line for said car, of, a wheel engaging the periphery of said flange at its uppermost point, said wheel rotatably mounted upon a pin, a bracket for supporting said pin, said wheel having an outer concave surface so as to more efficiently engage the periphery of said flange, means for causing said wheel to be at all times in engagement with the periphery of said flange, and means connected to said bracket for automatically operating the valves in said air line, said bracket supported in such a manner as to permit of upward and downward but not longitudinal movement of the same.

6. In a device of the character described a car structure, a supporting wheel having a flange, a valve controlled pipe, a support, suspending means for said support pivotally connected with said support and car structure, a feeler carried by said support, resilient means normally holding said support in a position to hold said feeler in engagement with the flange of said wheel, and means connecting said support with the valve of said pipe to operate said valve when said feeler moves into a broken place in the flange of said wheel.

7. In a device of the character described a support, a feeler carried by said support, means pivotally connected with said support for suspending the same beneath a car structure adjacent one of the supporting wheels thereof, resilient means for yieldably holding said support in a position to retain said feeler in engagement with the flange of the wheel of the car, and means for connecting said support with a valve of a train pipe whereby the valve will be actuated when the feeler is moved into a broken place in a flange of a wheel.

In testimony whereof I affix my signature in presence of two witnesses.

EARL A. McALEECE.

Witnesses:
MICHAEL P. METTEL,
J. M. BAULE.